US010362543B2

(12) United States Patent
Miranda et al.

(10) Patent No.: US 10,362,543 B2
(45) Date of Patent: *Jul. 23, 2019

(54) MULTI-CARRIER POWER POOLING

(71) Applicant: GOGO LLC, Chicago, IL (US)

(72) Inventors: Heinz A. Miranda, Cary, IL (US); Michael H. Baker, Elmhurst, IL (US); James P. Michels, Lake Zurich, IL (US); Yong Liu, Schaumburg, IL (US)

(73) Assignee: GOGO LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/193,937

(22) Filed: Nov. 16, 2018

(65) Prior Publication Data

US 2019/0110259 A1 Apr. 11, 2019

Related U.S. Application Data

(63) Continuation of application No. 15/452,402, filed on Mar. 7, 2017, now Pat. No. 10,159,050.
(Continued)

(51) Int. Cl.
H04W 52/34 (2009.01)
H04L 5/00 (2006.01)
(Continued)

(52) U.S. Cl.
CPC ...... H04W 52/346 (2013.01); H04B 7/18506 (2013.01); H04L 5/0007 (2013.01);
(Continued)

(58) Field of Classification Search
None
See application file for complete search history.

(56) References Cited

U.S. PATENT DOCUMENTS

| 8,145,251 B2 | 3/2012 | Love et al. |
| 8,422,434 B2 | 4/2013 | Vijayan et al. |

(Continued)

FOREIGN PATENT DOCUMENTS

| EP | 2278732 A2 | 1/2011 |
| WO | WO-2004/023677 A2 | 3/2004 |

(Continued)

OTHER PUBLICATIONS

International Search Report and Written Opinion, International application No. PCT/US2017/039631, dated Sep. 6, 2017.

(Continued)

*Primary Examiner* — Fayyaz Alam
(74) *Attorney, Agent, or Firm* — Marshall, Gerstein & Borun LLP; Randall G. Rueth

(57) ABSTRACT

Novel techniques for pooling the available transmit power of a beam across the subcarriers that are or that are scheduled to be in use (and not across all available subcarriers) are disclosed. The scheduled subcarriers may be located in the same or different carriers of a modulation transmitter modulation system, and the pooled transmit power may be allocated or distributed across the scheduled subcarriers of the beam. Modulation symbols or resource elements may be transmitted in accordance with allocated, per-subcarrier power budgets, thereby maximizing the SNIR of signals that are transmitted in the beam via the scheduled subcarriers. Additionally, the allocation of the pooled transmit power to various subcarriers may continuously and/or dynamically vary over time, e.g., based on traffic demands, interference characteristics, etc., as well as based on subsequent scheduling of subcarriers to transmit subsequent modulation symbols or resource elements.

20 Claims, 6 Drawing Sheets

Related U.S. Application Data

(60) Provisional application No. 62/358,437, filed on Jul. 5, 2016.

(51) Int. Cl.
  *H04B 7/185* (2006.01)
  *H04W 52/24* (2009.01)
  *H04W 16/14* (2009.01)

(52) U.S. Cl.
  CPC ........... *H04L 5/0058* (2013.01); *H04W 16/14* (2013.01); *H04W 52/241* (2013.01)

(56) References Cited

U.S. PATENT DOCUMENTS

| | | |
|---|---|---|
| 8,437,798 B2 | 5/2013 | Fabien et al. |
| 8,688,101 B1 | 4/2014 | Hayes et al. |
| 8,699,403 B2 | 4/2014 | Lynch et al. |
| 8,811,973 B2 | 8/2014 | Vijayan et al. |
| 8,848,605 B2 | 9/2014 | Ohm et al. |
| 9,954,600 B2 | 4/2018 | Miranda et al. |
| 2007/0173260 A1 | 7/2007 | Love et al. |
| 2008/0188228 A1 | 8/2008 | Pecen et al. |
| 2008/0240029 A1 | 10/2008 | Lynch et al. |
| 2009/0296681 A1 | 12/2009 | Tasa et al. |
| 2010/0067474 A1 | 3/2010 | Vijayan et al. |
| 2010/0272091 A1 | 10/2010 | Fabien et al. |
| 2012/0063522 A1 | 3/2012 | Fuss et al. |
| 2013/0230003 A1 | 9/2013 | Vijayan et al. |
| 2014/0235287 A1* | 8/2014 | Maltsev .............. H04W 52/267 455/522 |
| 2015/0085761 A1* | 3/2015 | Maltsev .............. H04B 7/0617 370/329 |
| 2016/0013858 A1* | 1/2016 | Jalali .................... H04B 7/2041 370/318 |
| 2016/0099769 A1* | 4/2016 | Moffatt .............. H04B 7/18506 455/431 |
| 2017/0230103 A1* | 8/2017 | Moffatt .............. H04B 7/18506 |
| 2018/0014261 A1 | 1/2018 | Miranda et al. |
| 2018/0175930 A1 | 6/2018 | Miranda et al. |

FOREIGN PATENT DOCUMENTS

| | | |
|---|---|---|
| WO | WO-2015/038591 A1 | 3/2015 |
| WO | WO-2018/009381 A1 | 1/2018 |
| WO | WO-2018/009382 A1 | 1/2018 |

OTHER PUBLICATIONS

U.S. Appl. No. 61/875,724, Interference Mitigation in an Air-to-Ground Wireless Communication Network, filed Sep. 10, 2013.

International Application No. PCT/US2017/039634, International Search Report and Written Opinion, dated Nov. 23, 2017.

* cited by examiner

|  |  | OFDM Symbol | | | | | |
| --- | --- | --- | --- | --- | --- | --- | --- |
|  |  | 0 | 1 | 2 | 3 | 4 | 5 |
| Total number of beams | | 3 | 3 | 3 | 1 | 1 | 2 |
| Beam 1 | Total Number of subcarriers used | 9 | 3 | 1 | 0 | 0 | 2 |
| | Average Power per Resource Element | 1/9 | 1/3 | 1 | 0 | 0 | 1/2 |
| Beam 2 | Total Number of subcarriers used | 9 | 3 | 1 | 3 | 0 | 2 |
| | Average Power per Resource Element | 1/9 | 1/3 | 1 | 1/3 | 0 | 1/2 |
| Beam 3 | Total Number of subcarriers used | 6 | 2 | 1 | 0 | 8 | 0 |
| | Average Power per Resource Element | 1/6 | 1/2 | 1 | 0 | 1/8 | 0 |
| Power per Carrier per Symbol | Carrier 1 | 1 | 0 | 0 | 0 | 1 | 1 |
| | Carrier 2 | 1 | 0 | 3 | 1 | 0 | 0 |
| | Carrier 3 | 1 | 3 | 0 | 0 | 0 | 1 |
| Total Power | | 3 | 3 | 3 | 1 | 1 | 2 |

FIG. 4B

MULTI-CARRIER POWER POOLING

CROSS-REFERENCE TO RELATED APPLICATIONS

The present application is a continuation of U.S. patent application Ser. No. 15/452,402 entitled "Multi-Carrier Power Pooling" and filed on Mar. 7, 2017, which claims priority to and the benefit of U.S. Provisional Patent Application No. 62/358,437 entitled "Hybrid Air-to-Ground Network Incorporating Unlicensed Bands" and filed on Jul. 5, 2016, the disclosures of which are hereby incorporated by reference herein in their entireties.

FIELD OF THE DISCLOSURE

Technical Field

The instant disclosure generally relates to pooling transmit power across the subcarriers that are or that are scheduled, at a base station or ground station, to be in use in a modulation system, such as a multicarrier and/or bandwidth adjustable modulation system, and maximizing signal-to-noise-plus-interference ratio (SNIR) for transmitted signals.

Background

The use of unlicensed spectrum for air to ground (ATG) communications is very attractive to In-Flight Connectivity (IFC) providers as the unlicensed spectrum allows IFC providers to tap into free spectrum that historically has been used for terrestrial services only. In the United States, the unlicensed 2.4 GHz and 5 GHz frequency bands are used for many terrestrial applications such as cordless phones, hearing aids, baby monitors, etc., as well as for terrestrial local/short-range communications systems such as Wi-Fi and Bluetooth. More recently, wideband, terrestrial cellular communications systems such as LTE (Long-Term Evolution) standard-based systems in the U.S. and other jurisdictions are using unlicensed spectrum for terrestrial cellular communications between cellular phones, smart devices, and the like.

The use of unlicensed spectrum in the U.S. is subject to strict jurisdictional rules. For example, the Federal Communications Commission (FCC) rules define, for each transmitter operating in the 2.4 GHz frequency band, maximum limits for its conducted or radiated power. For instance, per 47 CFR15.247 (c)(2)(ii), " . . . the total conducted output power shall be reduced by 1 dB below the specified limits for each 3 dB that the directional gain of the antenna/antenna array exceeds 6 dBi," and per 47 CFR15.247(c)(iii): "the aggregate power transmitted simultaneously on all beams shall not exceed the limit specified in paragraph (c)(2)(ii) of this section by more than 8 dB," and "[i]f transmitted beams overlap, the power shall be reduced to ensure that their aggregate power does not exceed the limit specified in paragraph (c)(2)(ii) of this section." These power limit requirements are defined per transmission beam within the total bandwidth of the 2.4 GHz frequency band, regardless of how much frequency bandwidth is used by the transmission beam. In other words, a beam transmitted in the 2.4 GHz frequency band using 500 KHz of bandwidth is limited to the same radiated power as a beam using 60 MHz of bandwidth.

The use of multicarrier modulation schemes like OFDM (Orthogonal Frequency-Divisional Multiplexing) in modern wideband communications systems allows systems to allocate different bandwidths to different users and to dynamically change the bandwidth allocations over time. Consequently, with OFDM, transmitters may be instructed to not use portions of the spectrum that could be subject to high interference coming from other users of the spectrum (e.g., Wi-Fi, Bluetooth, etc.). In a conventional LTE (Long-Term Evolution) standards-based system utilizing OFDM, the total power per modulation symbol is bounded by the total allowed transmission power per carrier, and the power per modulation symbol is budgeted as a fixed, pre-configured amount, e.g., the total power per carrier divided by the total number of configured subcarriers.

BRIEF SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In an embodiment, a wireless communication system may include a modulation transmitter configured to wirelessly communicate with a plurality of user terminals via a plurality of carriers, where each carrier supports a respective plurality of subcarriers. The modulation transmitter may support bandwidth adjustable modulation. For example, the modulation transmitter may support multicarrier modulation. The wireless communication system may further include a controller configured to determine a total number of subcarriers that are scheduled to be in use across the plurality of carriers, where the total number of scheduled subcarriers is less than a total number of available subcarriers across the plurality of carriers. Additionally, the controller may be configured to allocate, based on the total number of subcarriers that are scheduled to be in use across the plurality of carriers, a respective portion of a per-beam power budget to each subcarrier that is scheduled to be in use across the plurality of subcarriers, the per-beam power budget being a per-beam power limit; and control, in accordance with the allocated respective portions of the per-beam power budget, resource elements transmitted by the modulation transmitter to communicate with the plurality of user terminals via the subcarriers that are scheduled to be in use across the plurality of carriers.

In an embodiment, a method of maximizing the signal-to-interference-plus-noise ratio (SINR) of wireless signals transmitted to a particular user terminal may include, at a modulation transmitter system, forming at least one beam included in a plurality of non-overlapping beams in a frequency band, where the frequency band supports a plurality of carriers, each beam is to transmit data to a respective user terminal, and each beam is subject to a per-beam power limit. The method may also include allocating, to the particular user terminal, a bandwidth of a particular beam of the plurality of non-overlapping beams, where the bandwidth of the particular beam is less than a total bandwidth of the frequency band; determining, based on the bandwidth allocated to the particular user terminal and the per-beam power limit, a respective power budget for each resource element to be transmitted via the particular beam; and transmitting, to the particular user terminal via the particular beam, a set of resource elements in accordance with the determined respective power budgets. The modulation transmitter may support adjustable bandwidth modulation, for example, such as multicarrier modulation and/or other types of adjustable bandwidth modulation.

In an embodiment, a method of maximizing the signal-to-interference-plus-noise ratio (SINR) of wireless signals transmitted to a particular user terminal includes determining, by a controller, a total number of subcarriers that are scheduled to be in use across a plurality of carriers included in a beam formed by a modulation transmitter, where the total number of scheduled subcarriers across the plurality of subcarriers is less than a total number of available subcarriers across the plurality of carriers. The method may further include allocating, by the controller and based on the total number of subcarriers that are scheduled to be in use across the plurality of carriers, a respective portion of a per-beam power budget to each scheduled subcarrier, the per-beam power budget being a per-beam power limit; and controlling, by the controller in accordance with the allocated respective portions of the per-beam power budget, one or more resource elements transmitted by the modulation transmitter via the scheduled subcarriers of the beam to communicate data with a particular user terminal. The modulation transmitter may support adjustable bandwidth modulation, for example, such as multicarrier modulation and/or other types of adjustable bandwidth modulation.

BRIEF DESCRIPTION OF SEVERAL VIEWS OF THE DRAWINGS

FIG. 4B is a table illustrating how pooled power is assigned, distributed, or apportioned to the resource blocks of FIG. 4A;

DETAILED DESCRIPTION OF THE PREFERRED EMBODIMENTS

Figure 1:
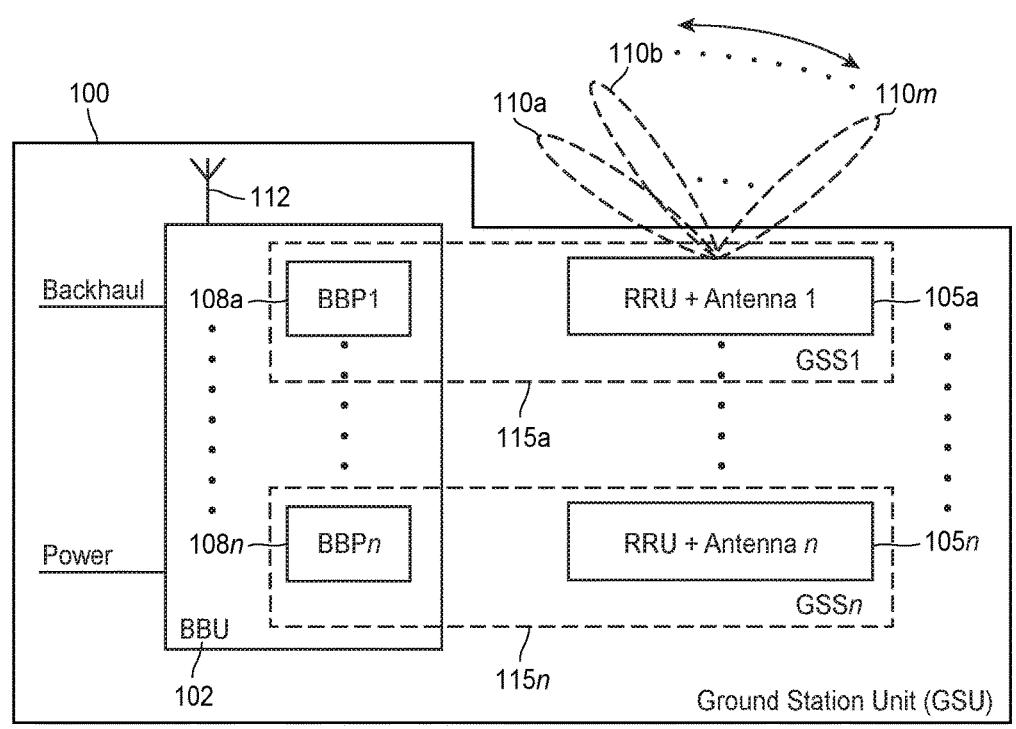
FIG. 1 is a block diagram of an example modulation ground station unit which may be utilized to pool transmit power and/or maximize the SINRs of wireless signals that are transmitted to in-flight aircraft.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

An in-flight connectivity (IFC) system may utilize various different air-to-ground frequency bands to communicate data and signaling between terrestrial ground stations (e.g., ground or terrestrial base stations) and aircraft that are in flight. For example, data and signaling used by pilots and other on-board crew members to navigate, operate, control, and/or service the aircraft may be communicated between the aircraft and the ground during flight. More recently, at least some of the communicated data transmitted between an in-flight aircraft and ground stations is for consumption by passengers or other users who are on-board the in-flight aircraft (e.g., text messages, media, streaming data, website content, etc.). The data for consumption or content data may be delivered from the ground stations to the aircraft via the air-to-ground frequency bands, and subsequently to an on-board network for delivery to personal electronic devices (PEDs) operated by passengers or users on board the aircraft. Examples of air-to-ground frequency bands utilized for various types of air-to-ground communications include the 849-851 MHz and 894-896 MHz bands in the United States, frequency bands utilized by ARINC (Aeronautical Radio, Incorporated) standards, and other direct air-to-ground frequency bands that are disposed directly between the aircraft and terrestrial base or ground stations. Other examples of air-to-ground frequency bands include satellite bands such as the $K_u$, $K_L$, $K_a$, and S bands, which require an intermediate satellite or other station to deliver data and signaling between the aircraft and a terrestrial base or ground station. Additionally, whether direct air-to-ground frequency bands or indirect (e.g., using a satellite or other suitable intermediary) air-to-ground frequency bands are utilized, various modulation schemes may be utilized to deliver data between the in-flight aircraft and terrestrial ground stations, such as satellite protocols and/or mobile communications protocols that are typically utilized for terrestrial cellular applications, e.g., TDMA (Time Division Multiple Access), GSM (Global System for Mobile Communications), CDMA (Code Division Multiple Access), EVDO (Evolution Data Optimized/Option), LTE (Long Term Evolution), and the like.

Generally speaking, conventional air-to-ground frequency bands (e.g., 849-851 MHz and 894-896 MHz bands, satellite bands, etc.) require licenses for operation therein. Thus, to supplement or augment in-flight connectivity, IFC providers are looking to unlicensed spectrum via which to transmit content data and signaling between terrestrial ground stations and aircraft. Examples of such options include the 2.4 GHz frequency band and the 5 GHz frequency band which, in the United States and other jurisdictions, at least respective portions of are unlicensed and therefore may be utilized by many different terrestrial applications, such as cordless phones, hearing aids, baby monitors, etc., as well as by local/short-range wireless communications systems (e.g., Wi-Fi, Bluetooth, etc.) and wideband terrestrial cellular communications systems such as LTE.

At least due to the wide range of applications that utilize unlicensed spectrum, its usage is subject to strict jurisdictional rules, including limits to transmitted power of beams. For instance, in the unlicensed 2.4 GHz spectrum, per 47 CFR15.247 (c)(2)(ii), "... the total conducted output power shall be reduced by 1 dB below the specified limits for each 3 dB that the directional gain of the antenna/antenna array exceeds 6 dBi," and per 47 CFR15.247(c)(iii): "the aggregate power transmitted simultaneously on all beams shall not exceed the limit specified in paragraph (c)(2)(ii) of this section by more than 8 dB," and "[i]f transmitted beams overlap, the power shall be reduced to ensure that their aggregate power does not exceed the limit specified in paragraph (c)(2)(ii) of this section." These power limit requirements are defined per transmission beam within the 83.5 MHz total bandwidth of the 2.4 GHz frequency band regardless of how much frequency bandwidth is used by the transmission beam. In other words, a beam transmitted in the 2.4 GHz frequency band using 500 KHz of bandwidth is limited to the same radiated power as a beam using 60 MHz of bandwidth.

Recently, wideband terrestrial cellular communications systems such as LTE (Long-Term Evolution) standard-based systems are starting to use the 2.4 GHz spectrum for use in communicating to/from terrestrial cellular phones, smart devices, and other types of wireless user terminals or personal electronic devices (PEDs). Conventional, terrestrial-based LTE systems operating in the 2.4 GHz frequency band typically utilize OFDM (Orthogonal Frequency Division Multiplexing), which is a type of digital multicarrier modulation scheme, for transmissions from terrestrial base stations to user terminals or PEDs. Generally, OFDM and other types of multicarrier modulation transmitters or transmitter systems wirelessly transmit respective data to user terminals via a plurality of carriers within a frequency band. To optimize communications, a multicarrier modulation transmitter or transmitter system may transmit respective data to multiple user terminals by respectively modulating respective streams of bits or data into a constellation that is appropriate to or based on the channel characteristics of each user terminal, and allocating the resulting modulation symbols to one or more carriers (and/or to subcarriers of the carriers) for delivery to the user terminal. For ease of reading herein, the description refers to a particular type of multi-carrier modulation, e.g., OFDM. However, it is noted that any or all the techniques, methods, and systems discussed herein with respect to OFDM transmitters and schemes are equally applicable to other types of suitable multicarrier modulation types or schemes, such as Generalized Frequency Division Multiplexing (GFDM), Filter Bank Multi Carrier (FBMC), etc. Additionally or alternatively, any or all the techniques, methods, and systems discussed herein with respect to OFDM transmitters and schemes are equally applicable to suitable bandwidth adjustable modulation types or schemes other than OFDM that are implemented on one or more carriers, as is explained further below.

As discussed above, in the unlicensed 2.4 GHz frequency band, the FCC rules define the maximum radiated power level per beam (up to a given maximum number of beams). As such, the signal-to-interference-plus-noise ratio (SINR) (which may also be referred to as signal-to-noise-plus-interference ratio or SNIR) per user can be maximized by transmitting the maximum allowed radiated power on each beam when each beam is assigned to service only one respective user.

However, in conventional terrestrial LTE/OFDM implementations, the maximum power that is radiated by a base or ground station is limited on a per carrier basis in accordance with LTE standards. Further, the amount of power that is budgeted to each subcarrier of a carrier is pre-configured and is the same for each subcarrier, e.g., power limit per carrier divided by the total number of available subcarriers. As is commonly known, a "subcarrier" generally refers to a secondary channel that resides within or is carried on top of a main channel, that is, a carrier within a carrier. The prefix "sub-" denotes that the subcarrier is related or derived from its corresponding carrier, however, typically, a subcarrier signal is modulated and demodulated separately from the main carrier signal.

At any rate, within conventional, terrestrial LTE/OFDM implementations, given the maximum per-carrier power limit and the pre-configured, per-subcarrier power limit, the use of a conventional LTE/OFDM transmitter in the 2.4 GHz frequency band for in-flight air-to-ground connectivity would result in a sub-optimal power distribution at least because power limits would be budgeted based on a per beam/per carrier basis, which is at odds with the greater distances between and higher levels of interference observed by ground transmitters and in-flight receivers (as compared to terrestrial base station transmitters and user terminals). In particular, conventional power budgeting of LTE/OFDM transmitters cannot create sufficient power density for in-flight air-to-ground connectivity applications.

The novel systems, methods, and techniques described herein address these and other inefficiencies and inadequacies. Generally, the systems, methods, and techniques described herein continuously and dynamically maximize the SINR of signals transmitted from ground stations to in-flight aircraft. In an embodiment, the maximum power limit or budget per transmission beam may be pooled, allocated, or distributed across the number of subcarriers that are in use or that are scheduled to be in use (e.g., in accordance with allocated user bandwidths), regardless of the particular carrier in which each in-use subcarrier is located. Thus, as the power budget is allocated amongst only resource blocks and/or respective resource elements corresponding to subcarriers in use (as contrasted with conventional power budget allocations that are pre-configured to be the same for all available subcarriers), the average power per resource element may increase over conventional power allocation techniques. Moreover, as the novel systems, methods and techniques described herein are not subject to a per-carrier power limit, the transmission beam power may be budgeted across all carriers utilized by the beam, thereby further increasing the average power per resource. As used herein, the term "resource element" generally refers to a particular, single subcarrier over the duration of a particular, single modulation symbol that may be used to transmit data, and the term "resource block" generally refers to a set of one or more subcarriers and a set of one or more modulation symbols that may be utilized to transmit data, for instance, a group of subcarriers and a group of modulation symbols.

FIG. 1 is a block diagram of an example modulation Ground Station Unit (GSU) 100 (also referred to interchangeably herein as a base station), a modulation transmitter, or a transmitter system) which may be utilized to maximize the SINRs of wireless signals transmitted to in-flight aircraft. In FIG. 1 and elsewhere within this disclosure, for ease of discussion, the modulation Ground Station Unit 100 is depicted and described as a multicarrier ground station unit or transmitter that is capable of transmitting over multiple carriers. However, any or all the techniques, methods, components, features, and/or aspects of the multicarrier Ground Station Unit 100 discussed herein are equally applicable to ground station units that support other types of bandwidth variable modulation, whether such ground station units transmit over multiple carriers or over a single carrier.

The Ground Station Unit 100 may include a Base Band Unit (BBU) 102 and one or more Remote Radio Units (RRUs), each of which may be connected to a respective antenna 105a-105n. As illustrated in FIG. 1, the BBU 102 may include one or more Base Band Processors (BBPs) or controllers 108a-108n, each of which may control a respective RRU-antenna pair 105a-105n. Generally, a BBP 108a-108n may perform baseband processing functions, such as frequency shifting, encoding, modulation, symbol forming, beam forming, etc. For example, a BBP 108a-108n may form symbols based on a characteristic of a channel corresponding to a target in-flight aircraft. The chassis of the BBU 102 may provide power, management functions, and a backhaul interface to the BBPs 108a-108n. In some embodiments, the BBU 102 may include a GPS antenna and receiver 112, e.g., for synchronization functions.

Each RRU-antenna pair 105a-105n may perform the up conversion of the digital data to a desired RF (Radio Frequency), as well as beam steering (and, in some scenarios, beam forming) of one or more respective beams 110a-110m (which, for ease of illustration, are only shown in FIG. 1 for the RRU-antenna pair 105a). As such, each RRU may include one or more respective processors or controllers. In an embodiment, each beam 110a-110m may be steered in azimuth and elevation to establish a point-to-point connection with a respective aircraft unit or receiver, and as such, each beam 110a-110m does not overlap with any other beam. Generally speaking, within the coverage range of the Ground Station Unit 100, a single beam 110a-110m may service or steer the life of a point-to-point connection between the Ground Station Unit 100 and a transceiver at a respective aircraft in order to maintain connectivity to the aircraft.

Thus, generally speaking, the beams 110a-110m may be non-overlapping beams which may be formed, for example, by beamforming. In an embodiment, the non-overlapping beams 110a-110m may be defined by weighting modulation symbols with appropriate phases, thereby creating non-overlapping beams. Further, in some embodiments, the amplitude of the weights may be selected to refine the non-overlapping of the beams.

In an embodiment, the BBPs 108a-108n and respective RRU-antenna pairs 105a-105n may be communicatively connected. Each BBP and RRU-antenna pair may be referred to as a Ground Station Sector (GSS) 115a-115n, each of which may support a respective set of point-to-point connections (e.g., via respective beams 110a-110m). Each GSS 115a-115n may operate in a frequency band independently of other GSSs provided by the ground station 100, and the respective coverage areas of the various GSSs 115a-115n provided by the ground station 100 do not overlap. In an embodiment, each GSS 115a-115n may form a wide beam that broadcasts a respective pilot signal that may be utilized by aircraft receivers for sector identification, channel sounding, etc. However, it is noted that the sectored implementation of the Ground Station Unit 100 illustrated in FIG. 1 is only one of many embodiments. For example, any number of any of the techniques discussed herein is equally applicable to ground station units that do not operate using sectors.

It is also noted that in FIG. 1, the Ground Station Unit 100 is illustrated as supporting 11 sectors or GSSs 115a-115n (i.e., 11 respective BBP/RRU/antenna systems), where 11 may be any positive integer such as 1, 2, 6, 10, etc. Additionally, RRU-antenna pair 105a is illustrated as generating m beams, where m may be any positive integer such as 1, 2, 4, 6, 16, etc. Further, different RRU-antenna pairs may generate the same or different respective numbers of beams. As such, given the flexibility of configuring different numbers of sectors (if any at all), different numbers of RRU-antenna pairs, and/or different numbers of beams transmitted per antenna, various Ground Station Units 100 may be engineered as desired to provide desired in-flight connectivity coverage in different environments.

Figure 2:
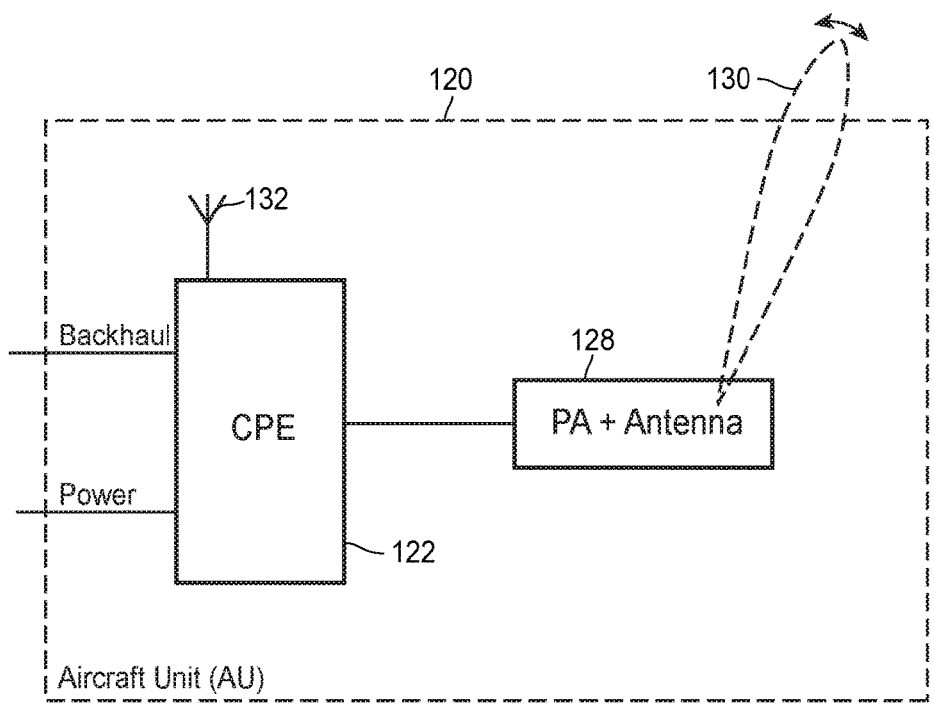
FIG. 2 is a block diagram of an example aircraft unit which may receive the signals transmitted by the modulation ground station unit of FIG. 1 while the aircraft unit is in-flight.

FIG. 2 is a block diagram of an example aircraft unit 120, which is also referred to interchangeably herein as a user terminal. As illustrated in FIG. 2, the aircraft unit 120 may include a Customer Premises Entity (CPE) 122 that is fixedly attached to an aircraft and a power amplifier (PA)-antenna pair 128. The CPE 122 may include a base band processor control unit and RF transceiver module (not shown), for example. Generally speaking, the CPE 122 may perform baseband processing functions and up conversion to RF, and the power amplifier (PA) may boost the RF signal generated by the CPE 122 prior to radiating out the antenna aperture. Additionally, the CPE 122 may control the pointing and/or steering of the beam 130 radiated by the antenna, e.g., in the azimuth direction and/or as desired. A single beam 130 may steer during the life of a point-to-point connection with a particular Ground Station Unit 100 in order to maintain in-flight connectivity, for example. In some implementations, the aircraft unit 120 may include multiple PA-antenna pairs (not shown), e.g., corresponding to multiple airborne sectors, and the CPE 122 may select one of the antenna pairs to use for communicating with one or more ground stations 100.

The CPE 122 and the PA-antenna pair 128 may be communicatively connected in any suitable manner, and the chassis of the aircraft unit 120 may provide power, management functions, and a backhaul interface to the CPE 122. In some embodiments, the CPE 122 may include a GPS antenna and receiver 132, e.g., for synchronization functions.

As discussed above, at least a portion of the frequency band(s) via which the Ground Station Units 100 and the aircraft units 120 communicate may be unlicensed and thus subject to high interference. In an embodiment, at least a portion of the frequency band(s) via which the Ground Station Units 100 and the aircraft units 120 communicate may be the unlicensed 2.4 GHz spectrum in the United States, and the concepts herein are discussed with respect to said frequency band. However, it is appreciated that any one or more of the systems, methods, and/or techniques discussed herein are applicable to other frequency bands, and in particular to other frequency bands whose use is unlicensed and/or that are subject to high amounts of interference, e.g., by other users and/or applications. The frequency band via which the Ground Station Units 100 and the aircraft units 120 communicate may support multiple carriers which may be modulated, for example, by OFDM. At any rate, the frequency band via which the Ground Station Units 100 and the aircraft units 120 communicate may support bandwidth-adjustable modulation, in an embodiment.

Generally speaking, to maximize the SINRs of wireless signals transmitted from Ground Station Units 100 to aircraft units 120, each beam 110a-110m may service only a single point-to-point connection between a sector (GSS) 115a-115n of a Ground Station Unit 100 and the aircraft unit 120. Each beam 110a-110m may be allocated a respective portion of the total available or assigned bandwidth of the frequency band for its point-to-point connection. Typically, but not necessarily, the beam's allocated bandwidth portion may be less than the entirety of the total available or assigned bandwidth of the frequency band, and may be allocated based on, for example, traffic demands, traffic characteristics, and/or interference characteristics. For example, the 2.4 GHz frequency band has an available total bandwidth of 83.5 MHz; however, each beam may be allocated to a respective, different portion of the available total bandwidth based on traffic demands and/or interference characteristics. Further, the allocated bandwidth of a beam may be partitioned across multiple carriers supported by the frequency band, or may be allocated to a single one of the multiple carriers. Thus, using the novel techniques disclosed herein, by scaling or apportioning OFDM symbol power based on the bandwidth allocated for the beam (instead of based on the power allocated per carrier), the radiated power in a given direction is bounded by the power requirements per transmission beam set forth by the FCC. Moreover, as the signal is transmitted at the maximum power allowed for the transmission beam, the SINR of the signal is maximized.

Figure 3:
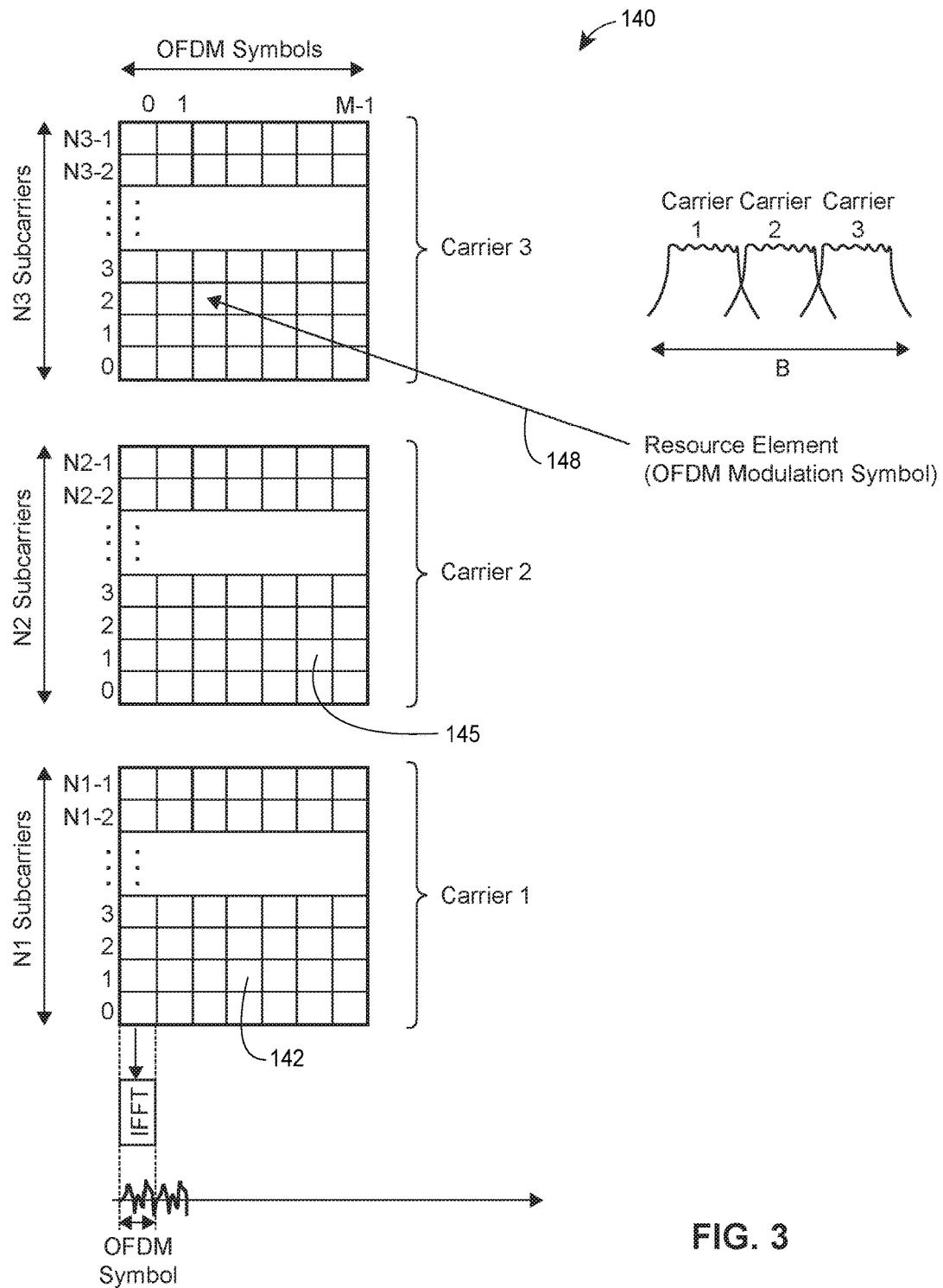
FIG. 3 depicts an example conventional power allocation across rce blocks that are available for transmissions from a modulation transmitter to one or more receivers.
Figure 4A:
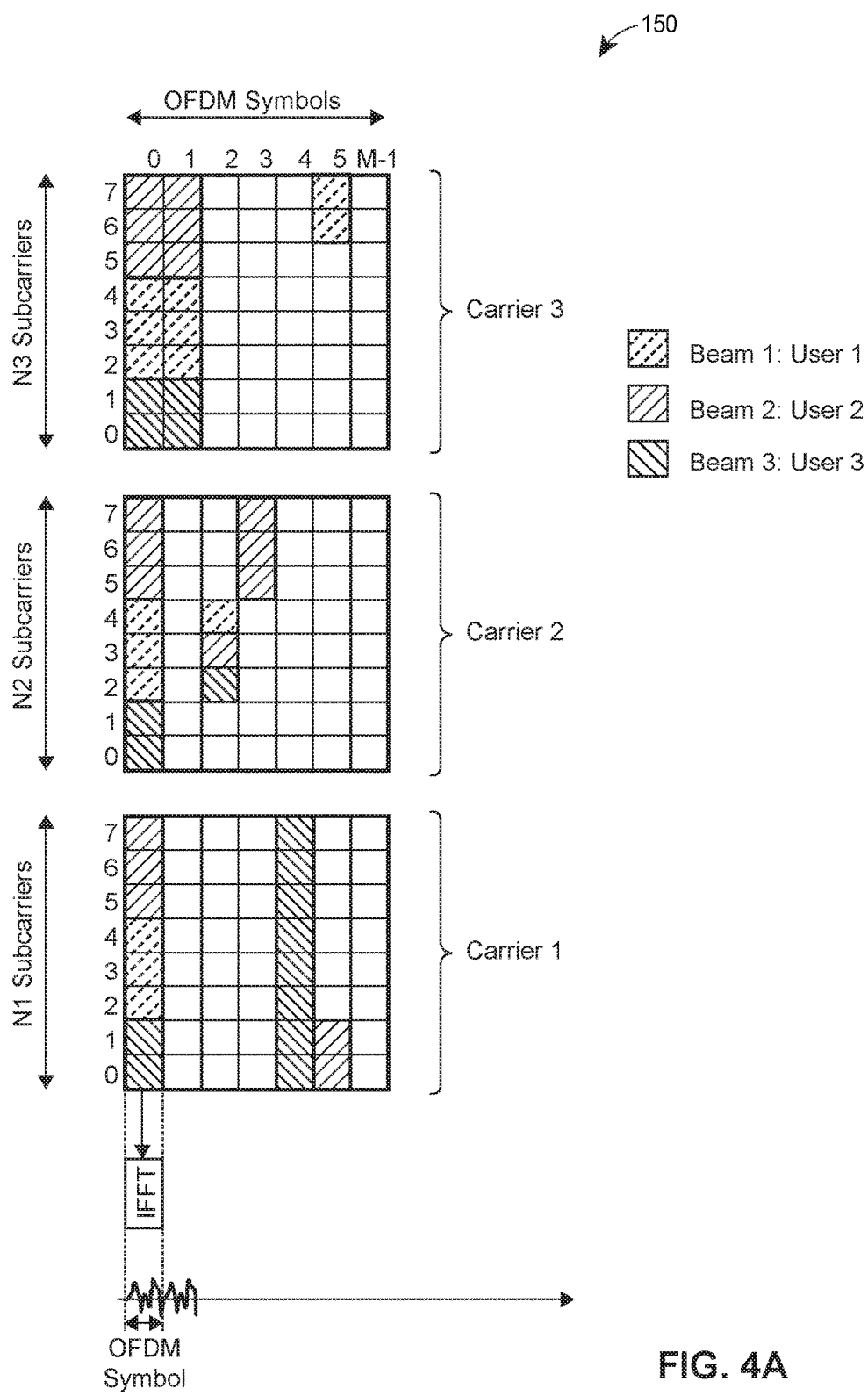
FIG. 4A depicts an example power allocation across resource blocks that are in use or that are scheduled to be in use for transmissions from a modulation ground station unit to one or more in-flight aircraft units, e.g., in accordance with at least some of the novel techniques described herein.

To illustrate, FIG. 3 depicts an example, conventional power allocation 140 across resource blocks (e.g., resource blocks of various OFDM symbols) which are available to be used for transmissions from a Ground Station Unit to one or more aircraft units via a frequency band of bandwidth B that has been partitioned into three OFDM carriers, i.e., Carrier 1, Carrier 2, and Carrier 3. It is noted that in FIGS. 3, 4A and 4B, and as discussed elsewhere herein, the term "OFDM symbol" is used (and illustrated) as a singular term for clarity of explanation only. However, each OFDM symbol (e.g., as shown in FIGS. 3, 4A, and 4B, and as discussed elsewhere herein) may be implemented as a group of two or more OFDM symbols, if desired. Further, each group of OFDM symbols may include different total numbers of symbols, if desired. Thus, the term "resource block," as used with respect to FIGS. 3, 4A and 4B and elsewhere herein, may refer to a single modulation symbol or to a group of modulation symbols, e.g., a single OFDM symbol or a group of OFDM symbols.

At any rate, in FIG. 3, each carrier is configured for a respective number of subcarriers, i.e., N1, N2, and N3, which may be the same or different numbers of subcarriers. Also in FIG. 3, possible or available OFDM symbols 0, 1, . . . M−1 are depicted. In typical OFDM implementations, each carrier has its own power budget $P_c$ which is divided across all of its subcarriers N, irrespective of whether or not the subcarriers are in use. As such, the average power per resource element (e.g., per possible or available subcarrier/modulation symbol) is pre-configured or pre-determined to a fixed value, and is the same for all users of the carrier. For example, the power allocated for each resource element 142 transmitted over Carrier 1 would be limited to $P_c/N1$, the power per resource element 145 transmitted over Carrier 2 would be limited to $P_c/N2$, and the power per resource element 148 transmitted over Carrier 3 would be limited to $P_c/N3$.

However, by utilizing the unique power allocation techniques described herein, the average power per resource element may be able to be greatly increased over typical OFDM implementations. In an embodiment, the maximum power limit per transmission beam $P_B$ may be pooled and subsequently apportioned, allocated, or distributed across only the number of subcarriers that are or that are scheduled to be in use (e.g., scheduled in accordance with allocated user bandwidths), regardless of the carrier in which each in-use subcarrier is located. Thus, as the power budget is allocated amongst only resource elements corresponding to subcarriers in use or that are scheduled to be in use (as contrasted with conventional power budget allocations across all possible or available subcarriers), the average power per resource element may increase, and in particular in scenarios in which all available subcarriers are not allocated for use. Moreover, as the system is not subject to a per-carrier power limit, the transmission beam power $P_B$ may be budgeted across all carriers, thereby further increasing the average power per resource element.

To illustrate, FIG. 4A depicts an example power allocation 150 for resource elements that are transmitted from a ground station unit to aircraft units via the example three-carrier-partitioned frequency band of bandwidth B shown in FIG. 3. For ease of discussion and illustration, in FIG. 4A each carrier is shown as having same number of subcarriers, e.g., N1=N2=N3=8, although it is understood that the concepts described herein apply equally to carriers that have different numbers of subcarriers. Additionally, for ease of discussion but not for limitation purposes, FIG. 4A is discussed with simultaneous reference to FIGS. 1 and 2.

The example power allocation 150 shown in FIG. 4A is for three different point-to-point connections between a Ground Station Unit 100 and three different aircraft units or user terminals 120. Each point-to-point connection is supported by its own respective beam 110a-110m, which, as previously discussed, are non-overlapping beams. For example, the point-to-point connection between the ground station unit and aircraft unit/user 1 may be supported by Beam 1 (e.g., beam 110a), the point-to-point connection between the ground station unit and aircraft unit/user 2 may be supported by Beam 2 (e.g., beam 110b), and the point-to-point connection between the ground station unit and aircraft unit/user 3 may be supported by Beam 3 (e.g., beam 110m). Additionally, the respective bandwidth of each of Beams 1-3 has been allocated based on traffic demands and/or interference considerations, and accordingly, the respective bandwidths of Beams 1-3 may differ. In an embodiment, the Base Band Processing Unit 108a-108n or other processor at the Ground Station Unit 100 may allocate the respective bandwidth of each beam. Generally, an allocated bandwidth of a beam corresponds to one or more subcarriers to which transmissions of the beam are scheduled to utilize, and the scheduled subcarriers may be located in different carriers. For example, as shown in FIG. 4A, in the OFDM symbol 0, Beam 1 has been allocated or scheduled to use subcarriers 5-7 of Carrier 3, subcarriers 5-7 of Carrier 2, and subcarriers 5-7 of Carrier 3. In the OFDM symbol 2, Beam 1 has been allocated or scheduled to use subcarrier 4 of Carrier 2, Beam 2 has been allocated or scheduled to use subcarrier 3 of Carrier 2, and Beam 3 has been allocated or scheduled to use subcarrier 2 of Carrier 2. Typically, each beam is allocated a bandwidth less than the total available bandwidth of the frequency band, but in some situations, the entire bandwidth of the frequency band may be allocated to a particular beam.

FIG. 4B depicts a table 160 illustrating the assignment, distribution, or apportionment of portions of pooled power to the resource elements that are in use or that are scheduled to be in use of FIG. 4A, e.g., the resource elements that are shaded in FIG. 4A. For ease of discussion, for FIGS. 4A and 4B, the maximum power available for each beam (e.g., the maximum power limit per transmission beam) is $P_B=1$. Thus, as shown in FIG. 4B, in the OFDM symbol 0, for Beam 1 a total of 9 subcarriers are being (or been scheduled to be) used, and accordingly, the average power per resource element of Beam 1 is 1/9 (reference 162a). Also in the OFDM symbol 0, a total of 9 subcarriers are being (or have been scheduled to be) used in Beam 2, and as such the average power per resource element of Beam 2 is 1/9 (reference 162b). For Beam 3 in OFDM symbol 0, a total number of 6 subcarriers are being (or have been scheduled to be) used, and as such the average power per resource element of Beam 3 is 1/6 (reference 162c). Note that for the different scenarios depicted in the different OFDM symbols 1-5 of the table 160, the total power available per beam $P_B=1$ is pooled across all subcarriers that are in use (or that are scheduled to be in-use) for a given beam, even if the scheduled, in-use subcarriers are located on different OFDM carriers. Further, subcarriers that are not in-use or that are not scheduled to be in-use for the given beam are not allocated any portion of the beam's power budget $P_B$.

In an embodiment, the average power per modulation symbol/per subcarrier (e.g., per resource element) 162a-162c of each beam 110a-110m (which is interchangeably referred to herein as a "beam 110" for purposes of ease of reading) may be respectively applied to each resource element for transmission. For example, the average power per resource element may be utilized as a power scaling factor that is applied to each resource element transmitted via the beam 110 from the Ground Station Unit 100 to the respective aircraft unit 120. That is, the value of the average power per resource element 162a-162c may be applied respectively to resource elements (e.g., by a respective RRU 105a-105n) to scale the power of each resource element transmitted via the beam 110. As such, in this embodiment, the total radiated power of the beam 110 is guaranteed to be within the maximum transmission beam power limit $P_B$.

In other embodiments, the actual power of each resource element transmitted via the beam 110 may not be the average power per resource element applied as a scaling factor, but may vary across resource elements and/or may be determined by other factors, such as interference conditions. At any rate, in such embodiments, the total power radiated across all utilized resource elements of a beam may nonetheless be within the maximum transmission beam power limit $P_B$.

In an embodiment, the average and/or actual power budget for each resource element (e.g., for each modulation symbol per subcarrier that is in use or that is scheduled to be in use) in a beam 110 may be determined by one or more processors executing computer-readable instructions stored on a non-transitory memory or storage medium. For example, one or more processors included in the BBU 102, the BBPs 108a-108n, and/or the RRUs 105a-105n may determine the average and/or actual power budget for each modulation symbol per subcarrier that is in use or that is scheduled to be in use in the beam 110. For example, a controller that generates and schedules OFDM symbols may determine respective power budgets for the respective resource elements included in the created OFDM symbols, which correspond to the subcarriers that are scheduled to be used across the multiple carriers for transmitting the OFDM symbols. As such, the average transmitted power of each resource element may vary in accordance with the total number of subcarriers that are in use or that are scheduled to be in use across the multiple carriers.

Importantly, the power budgets of the resource elements may be dynamically determined and applied based on which resource elements and resource blocks are scheduled to be transmitted via which respective subcarriers. As such, over time, the maximum allowed power per transmission beam is continuously available for use over the scheduled set of resource elements, and accordingly, the SINR of a signal transmitted to an aircraft unit 120 is maximized.

Figure 5:
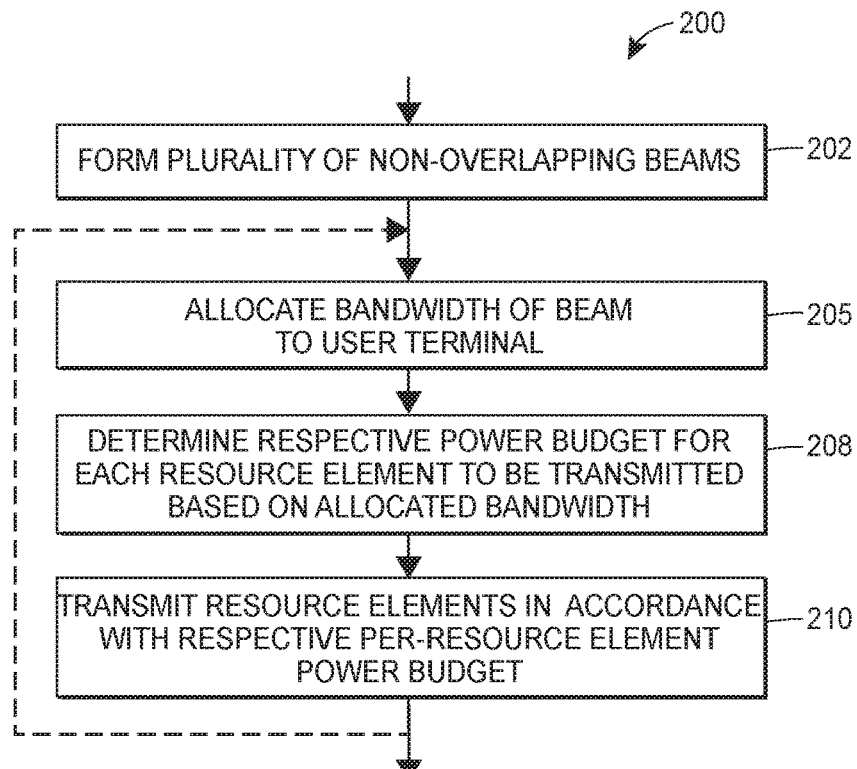
FIG. 5 depicts a flow chart of an example method of maximizing the signal-to-interference-plus-noise ratio (SINR) of wireless signals transmitted to a particular user terminal or aircraft unit.

FIG. 5 is a flow chart of an example method 200 of maximizing the signal-to-interference-plus-noise ratio (SINR) of wireless signals transmitted to a particular user terminal or aircraft unit. The method 200 may operate in conjunction with the multicarrier modulation Ground Station Unit 100 of FIG. 1, the aircraft unit 200 of FIG. 2, and/or in accordance with the power allocation principles described with respect to FIGS. 4A and 4B. In an embodiment, the method 200 may be performed by at least a portion of the multicarrier modulation Ground Station Unit or transmitter system 100.

At a block 202, the method 200 may include forming a plurality of non-overlapping beams in a frequency band. The frequency band may support a plurality of carriers, and each carrier may include a respective one or more subcarriers. Each non-overlapping beam may service a respective user terminal, which may be an aircraft unit 120, for example. Further, each non-overlapping beam may be subject to a per-beam power limit, e.g., based on jurisdictional requirements.

At a block 205, the method 200 may include allocating, to the particular user terminal, a bandwidth of a particular beam of the non-overlapping beams. The bandwidth typically, but not necessarily, may be less than a total bandwidth of the frequency band, and the allocated bandwidth may span multiple carriers. For example, the allocated bandwidth may include a number of subcarriers located in a first carrier, and another number of subcarriers located in a second carrier. The allocation of the beam bandwidth may be based on, for example, traffic demands, traffic characteristics, interference characteristics, and/or other factors. Generally speaking, the allocated beam services only the particular user terminal and not other user terminals during the lifetime of the point-to-point connection between the ground station unit and the particular user terminal. However, the allocated bandwidth of the beam servicing the particular user terminal may vary based on, for example, traffic demands, traffic characteristics, interference characteristics, and/or other factors. In some scenarios, the allocated bandwidth may vary during the lifetime of the point-to-point connection between the ground station unit and the particular user terminal. Typically, the allocated bandwidth varies throughout a majority of the lifetime of the point-to-point connection between the ground station unit and the particular user terminal.

At a block 208, the method 200 may include determining, based on the bandwidth allocated to the particular user terminal and based on the per-beam power limit, a respective power budget for each resource element of a resource block that is to be transmitted via the beam. In an embodiment, the total number of resource elements included in the resource block is based on the allocated bandwidth. The resource block may include a respective single modulation symbol, or may include a respective group of modulation symbols. The modulation symbol(s) may be generated, for example, based on a characteristic of a channel responding to the particular user terminal. In an embodiment, the modulation symbols utilized within the method 200 are included in an OFDM symbol.

In an embodiment, the respective power budget of each resource element may be determined based on the per-beam power limit and the number of scheduled subcarriers via which the resource block is to be transmitted. For example, an average power budget per resource element may be determined by dividing the per-beam power limit by the number of subcarriers that are scheduled to be in use, and the determined average power budget per resource element may be respectively applied to each resource element. For instance, power scaling of modulation symbols may be performed using the average power budget per resource element. In another example, an actual power budget for each resource element may be determined based on the allocated bandwidth of the beam, where at least two different resource elements may be allocated different respective power budgets. However, in this example, the sum of all per-resource element power budgets may not exceed the per-beam power limit.

At a block 210, the method 200 may include transmitting, to the particular user terminal via the particular beam, a set of resource elements included in the resource block in accordance with the determined respective per-resource element power budgets.

In an embodiment, the blocks 205-210 of method 200 may repeat due to updated or changed conditions, as indicated by the dashed arrow in FIG. 5. For example, at a subsequent time, the method 200 may include allocating an updated bandwidth of the beam servicing the particular user terminal, e.g., based on an updated set of resource elements, an updated resource block, changed interference conditions, changed traffic demands, etc. (block 205); determining an updated respective power budget for each updated resource element, e.g., based on the updated bandwidth and the per-beam power limit (block 208); and transmitting the updated set of resource elements in accordance with the updated respective power budgets (block 210).

Figure 6:
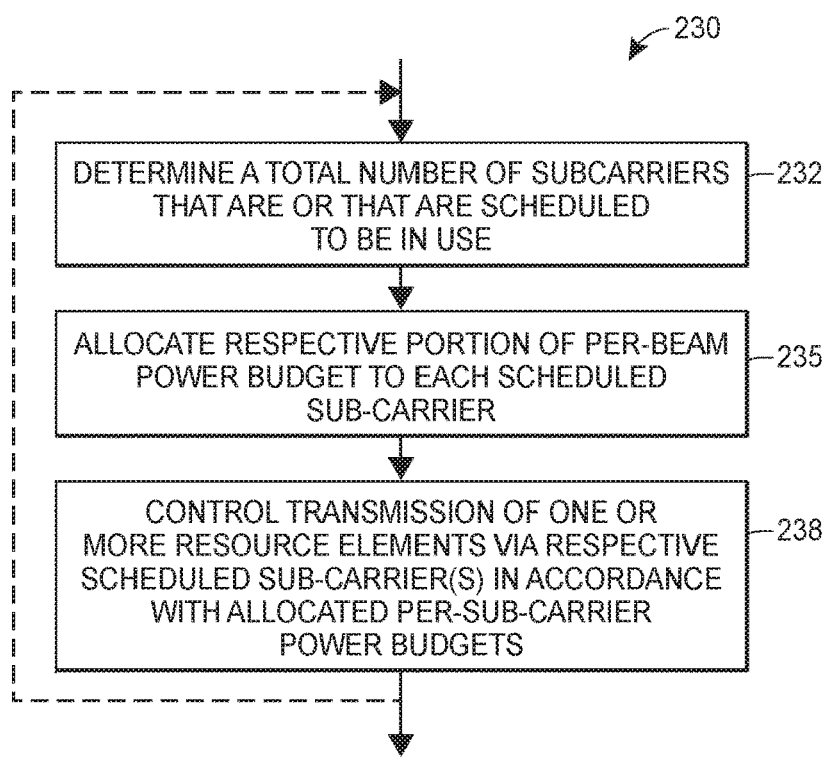
FIG. 6 depicts a flow chart of an example method of maximizing the signal-to-interference-plus-noise ratio of wireless signals transmitted to a particular user terminal or aircraft unit.

FIG. 6 is a flow chart of an example method 230 of maximizing the signal-to-interference-plus-noise ratio (SINR) of wireless signals transmitted to a particular user terminal or aircraft unit. The method 230 may operate in conjunction with the multicarrier modulation Ground Station Unit 100 of FIG. 1, the aircraft unit 200 of FIG. 2, in accordance with the power allocation principles described with respect to FIGS. 4A and 4B, and/or in conjunction with the method 200 of FIG. 5. In an embodiment, the method 200 may be performed by at least a portion of the multicarrier modulation ground station unit or transmitter system 100.

At a block 232, the method 230 may include determining, by a controller, a total number subcarriers that are scheduled to be in use across a plurality of carriers. The plurality of carriers is included in one or more beams that are formed by a multicarrier modulation transmitter, and each carrier may include a respective one or more subcarriers. The total number of scheduled subcarriers that are scheduled to be in use across a plurality of carriers may be less than a total number of available subcarriers across a plurality of carriers, and different subcarriers of different carriers may be scheduled to be used in various OFDM symbols. Indeed, in an embodiment, the total number of subcarriers that are scheduled to be in use across the plurality of carriers is based on the set of OFDM symbols that are formed by the multicarrier modulation transmitter. The OFDM symbols may be formed or generated in any desired manner, such as based on one or more channel characteristics corresponding to a target user terminal.

At a block 235, the method 230 may include allocating, by the controller, a respective portion of a per-beam power budget to each scheduled subcarrier. The per-beam power budget may be a per-beam power limit set forth by jurisdictional entity, for example, and in an embodiment, the sum of the respective portions of the per-beam power budget is the entirety or a majority of the per-beam power budget. In an embodiment, the respective portions of the per-beam power budget may be determined as an average, e.g., by dividing the per-beam power budget by the total number of scheduled subcarriers corresponding to a particular beam, so that the per-subcarrier power budget is an average per-subcarrier power budget, which may be applied as a scaling factor, for instance. In other embodiments, the portioning of the per-beam power budget may be additionally or alternatively determined based on other factors, such as interference characteristics, and as such, different subcarriers may be allocated differently sized portions of the per-beam power budget. That is, in these embodiments, the per-subcarrier power budget may differ across different sub-carriers that are scheduled to be in use.

At a block 238, the method 230 may include controlling, by the controller and in accordance with the allocated respective portions of the per-beam power budget, one or more resource elements that are transmitted by the carrier modulation transmitter via the scheduled subcarriers of the beam to communicate data with a particular user terminal, which may be a particular aircraft unit 120, in an embodiment. For example, when the respective portions of the per-beam power budget are determined as an average power budget per subcarrier, each resource element corresponding to a respective subcarrier may be power scaled based on the average power budget per subcarrier. Generally speaking, as each beam services only one user terminal, the maximum per-beam power budget may thereby be applied across only the subcarriers that are in use, thereby maximizing the SINR of wireless signals transmitted to the particular user terminal.

In an embodiment, the blocks 232-238 of method 230 may repeat at a second or subsequent time, e.g. due to updated or changed conditions, as indicated by the dashed arrow in FIG. 6. For example, at a second or subsequent time, the method 230 may include determining an updated total number of subcarriers that are scheduled to be in use to service the particular user terminal, e.g., based on an updated set of resource elements, an updated set of resource blocks, changed interference conditions, changed traffic demands, etc. (block 232); allocating a respective portion of the per-beam power budget to each subcarrier that is scheduled to be in use at the second or subsequent time (block 235); and controlling, in accordance with the allocated, respective portions of the per-beam budget for the subcarriers are scheduled to be in use of the second or subsequent time, at least one resource element transmitted by the multicarrier modulation transmitter via the subcarriers that are scheduled to be in use at the second or subsequent time to communicate data with the particular user terminal (block 238).

With further respect to the method 230, the beam that is formed by the multicarrier modulation transmitter may be included in a plurality of non-overlapping beams, where each non-overlapping beam is subject to the per-beam power limit. In an embodiment, the multicarrier modulation transmitter may be in OFDM transmitter, and various sets of one or more resource elements may be included in respective OFDM symbols.

It is noted that although the description herein is discussed with respect to unlicensed frequency bands, such as the 2.4 GHz frequency band, the novel power allocation systems, methods and techniques described herein may be equally applied to licensed frequency bands, to any frequency band in which beams may be subject to a per-beam power limit, and/or to any frequency band in which a per-carrier power limit is not required. Moreover, the novel power allocation systems, methods and techniques described herein may be applied to use cases and/or applications other than air-to-ground connectivity to continuously achieve maximum SINR for signals transmitted to target user terminals. For example, any number of any of the novel techniques discussed herein may be applied to terrestrial cellular communication base stations, short-range or local communication transmitters such as Wi-Fi hotspots, and the like.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof. By way of example, and not limitation, the disclosure herein contemplates at least the following aspects:

1. A wireless communication system comprising a modulation transmitter configured to wirelessly communicate with a plurality of user terminals via a plurality of carriers, where each carrier included in the plurality of carriers respectively supports a plurality of subcarriers. The wireless communication system further comprises a controller configured to determine a total number of subcarriers that are scheduled to be in use across the plurality of carriers, where the total number of scheduled subcarriers is less than a total number of available subcarriers across the plurality of carriers; and allocate, based on the total number of subcarriers that are scheduled to be in use across the plurality of carriers, a respective portion of a per-beam power budget to each subcarrier that is scheduled to be in use across the plurality of subcarriers, the per-beam power budget being a per-beam power limit. Additionally, the controller is further configured to control, in accordance with the allocated respective portions of the per-beam power budget, resource elements transmitted by the modulation transmitter to communicate with the plurality of user terminals via the subcarriers that are scheduled to be in use across the plurality of carriers. The modulation transmitter may comprise a multicarrier modulation transmitter or another type of bandwidth adjustable modulation transmitter, for example.

2. The wireless communication system of the previous aspect, wherein the modulation transmitter forms a plurality of non-overlapping beams radiated by an antenna system, each non-overlapping beam supports the plurality of carriers, and each non-overlapping beam is for establishing a point-to-point connection with a respective user terminal.

3. The wireless communication system of any one of the previous aspects, wherein each non-overlapping beam of the plurality of non-overlapping beams is respectively subject to the per-beam power budget.

4. The wireless communication system of any one of the previous aspects, wherein a first non-overlapping beam has a first bandwidth allocated to a first user terminal, and a second non-overlapping beam has a second bandwidth allocated to a second user terminal. The first bandwidth and the second bandwidths may be of same or different respective magnitudes.

5. The wireless communication system of any one of the previous aspects, wherein the controller is further configured to control a modulation scheme of data to be transmitted via the modulation transmitter to a particular user terminal of the plurality of user terminals based on a channel characteristic corresponding to the particular user terminal, thereby generating a group of modulation symbols. The controller is still further configured to allocate at least two modulation symbols included in the group of modulation symbols across multiple subcarriers for transmission to the particular user terminal, wherein the allocated multiple subcarriers are included in the subcarriers that are scheduled to be in use across the plurality of carriers. In an embodiment, at least two of the allocated multiple subcarriers are supported by a same carrier included in the plurality of carriers. Additionally or alternatively, at least two of the allocated multiple subcarriers may be respectively supported by different carriers included in the plurality of carriers.

6. The wireless communication system of any one of the previous aspects, wherein the modulation scheme is an OFDM modulation scheme, and each group of modulation symbols is a respective OFDM symbol.

7. The wireless communication system of any one of the previous aspects, wherein the respective portions of the per-beam power budget allocated to the scheduled subcarriers are an average power budget per resource element.

8. The wireless communication system of any one of the previous aspects, wherein the plurality of carriers are included in the 2.4 GHz frequency band, which may be an unlicensed band.

9. A method of maximizing the signal-to-interference-plus-noise ratio (SINR) of wireless signals transmitted to a particular user terminal. The method comprises, at a modulation transmitter system: forming at least one beam included in a plurality of non-overlapping beams in a frequency band, the frequency band supporting a plurality of carriers, each beam to transmit data to a respective user terminal, and each beam subject to a per-beam power limit; allocating, to the particular user terminal, a bandwidth of a particular beam of the plurality of non-overlapping beams, the bandwidth of the particular beam being less than a total bandwidth of the frequency band; determining, based on the bandwidth allocated to the particular user terminal and the per-beam power limit, a respective power budget for each resource element to be transmitted via the beam; and transmitting, to the particular user terminal via the particular beam, a set of resource elements in accordance with the determined respective power budgets. The modulation transmitter may comprise a multicarrier modulation transmitter or another type of bandwidth adjustable modulation transmitter, for example. In an embodiment, the particular beam is included in the formed at least one beam.

10. The method of the previous aspect, performed by the wireless communication system of any one of aspects 1-8.

11. The method of any one of aspects 9-10, wherein a total number of resource elements included in the set of resource elements corresponding to the particular user terminal is based on the bandwidth allocated to the particular user terminal, and wherein the respective power budget for the each resource element is determined, for a particular time interval, based on a ratio of the per-beam power limit and the total number of resource elements.

12. The method of any one of aspects 9-11, wherein each resource element included in the set of resource elements is included in a group of modulation symbols, and the method further comprises generating the group of modulation symbols based on a characteristic of a channel corresponding to the particular user terminal.

13. The method of any one of aspects 9-12, wherein the modulation transmitter system includes an OFDM transmitter, and wherein the respective group of modulation symbols is included in a respective OFDM symbol.

14. The method of any one of aspects 9-13, wherein allocating the bandwidth of the particular beam to the particular user terminal comprises allocating the bandwidth of the particular beam across at least one carrier supported by the particular beam. In an embodiment, the bandwidth is allocated across more than one carrier supported by the particular beam.

15. The method of any one of aspects 9-14, wherein each carrier included in the more than one carrier of the particular beam includes a respective plurality of subcarriers, and wherein allocating the bandwidth of the particular beam to the particular user terminal across the more than one carrier supported by the particular beam comprises allocating a bandwidth including a first subcarrier of a first carrier supported by the particular beam and including a second subcarrier of a second carrier supported by the particular beam.

16. The method of any one of aspects 9-15, wherein the set of resource elements transmitted to the particular user terminal is a first set resource elements, and the method further comprises allocating an updated bandwidth of the particular beam to the particular user terminal. The updated bandwidth corresponds to an updated set of resource elements allocated to the particular user terminal, and the updated set of resource elements has a different total number of resource elements than a total number of the first set of resource elements. Additionally, the method further includes determining, based on the updated bandwidth allocated to the particular user terminal and the per-beam power limit, an updated respective power budget for each resource element included in the updated set of resource elements; and transmitting, to the particular user terminal via the particular beam, the updated set of resource elements in accordance with the determined, updated respective power budgets.

17. The method of any one of aspects 9-16, wherein forming the plurality of non-overlapping beams in the frequency band comprises forming at least one of the plurality of non-overlapping beams in an unlicensed frequency band.

18. A method of maximizing the signal-to-interference-plus-noise ratio (SINR) of wireless signals transmitted to a particular user terminal. The method comprises determining, by a controller, a total number of subcarriers that are scheduled to be in use across a plurality of carriers included in a beam formed by a modulation transmitter, where the total number of scheduled subcarriers across the plurality of subcarriers is less than a total number of available subcarriers across the plurality of carriers. The method further comprises allocating, by the controller and based on the total number of subcarriers that are scheduled to be in use across the plurality of carriers, a respective portion of a per-beam power budget to each scheduled subcarrier, the per-beam power budget being a per-beam power limit; and controlling, by the controller in accordance with the allocated respective portions of the per-beam power budget, one or more resource elements transmitted by the modulation transmitter via the scheduled subcarriers of the beam to communicate data with a particular user terminal. The modulation transmitter may comprise a multicarrier modulation transmitter or another type of bandwidth adjustable modulation transmitter, for example.

19. The method of aspect 18, performed by the wireless communication system of any one of aspects 1-8.

20. The method of any one of aspects 18-19, performed in conjunction with the method of any one of aspects 9-17.

21. The method of any one of aspects 18-20, further comprising generating at least one resource block for transmission, via more than one scheduled subcarrier and in accordance with the respective portions of the per-beam power budget of the more than one scheduled subcarrier, to the particular user terminal based on a channel characteristic corresponding to the particular user terminal; and wherein a first subcarrier of the more than one scheduled subcarrier is included in a first carrier supported by the beam, and a second subcarrier of the more than one scheduled subcarrier is included in a second carrier supported by the beam.

22. The method of any one of aspects 18-21, wherein the total number of subcarriers that are scheduled to be in use across the plurality of carriers comprises a total number of subcarriers that are scheduled to be in use across a plurality of carriers at a first time, and the method further comprises determining an updated total number of subcarriers that are scheduled to be in use, at a second time subsequent to the first time, across the plurality of carriers included in the beam. The method further comprises allocating, based on the updated total number of subcarriers that are scheduled to be in use across the plurality of carriers at the second time, a respective portion of the per-beam power budget to each subcarrier that is scheduled to be in use at the second time; and controlling, in accordance with the allocated respective portions of the per-beam power budget of the subcarriers that are scheduled to be in use at the second time, at least one resource element transmitted by the modulation transmitter via the subcarriers that are scheduled to be in use at the second time to communicate data with the particular user terminal.

23. The method of any one of aspects 18-22, wherein at least one of: (i) the beam formed by the modulation transmitter is included in a plurality of non-overlapping beams formed by the modulation transmitter, and each non-overlapping beam is respectively subject to the per-beam power limit; (ii) the modulation transmitter is an OFDM transmitter; (iii) the one or more resource elements are included in a respective OFDM symbol; (iv) the plurality of carriers is included in an unlicensed frequency band; or (v) the plurality of carriers is included in a 2.4 GHz frequency band.

24. Any one of the above aspects in combination with any other one of the above aspects.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed:
1. A wireless communication system, comprising:
  a modulation transmitter configured to wirelessly communicate with a plurality of user terminals via a plurality of carriers, each carrier supporting a plurality of subcarriers; and a controller configured to:
- allocate a per-beam power budget among a total number of resource elements that are scheduled to be in use across the plurality of carriers, the total number of scheduled resource elements being less than a total number of available resource elements across the plurality of carriers, each available resource element corresponding to a respective, single subcarrier over a duration of a respective, single modulation symbol, and the per-beam power budget being a per-beam power limit; and
- control resource elements transmitted by the modulation transmitter to communicate with the plurality of user terminals in accordance with the allocation of the per-beam power budget.

2. The wireless communication system of claim 1, wherein the modulation transmitter forms a plurality of non-overlapping beams radiated by an antenna system, each non-overlapping beam supports the plurality of carriers, and each non-overlapping beam is for establishing a point-to-point connection with a respective user terminal.

3. The wireless communication system of claim 2, wherein each non-overlapping beam of the plurality of non-overlapping beams is respectively subject to the per-beam power budget.

4. The wireless communication system of claim 3, wherein a first non-overlapping beam has a first bandwidth allocated to a first user terminal, and a second non-overlapping beam has a second bandwidth allocated to a second user terminal.

5. The wireless communication system of claim 1, wherein the controller is further configured to:
- control a modulation scheme of data to be transmitted via the modulation transmitter to a particular user terminal of the plurality of user terminals based on a channel characteristic corresponding to the particular user terminal, thereby generating a group of modulation symbols; and
- allocate at least two modulation symbols included in the group of modulation symbols across multiple subcarriers for transmission to the particular user terminal, wherein the allocated multiple subcarriers are included in the resource elements that are scheduled to be in use across the plurality of carriers.

6. The wireless communication system of claim 5, wherein the modulation scheme is an OFDM modulation scheme, and each group of modulation symbols is a respective OFDM symbol.

7. The wireless communication system of claim 1, wherein the respective portions of the per-beam power budget allocated to the scheduled resource elements are an average power budget per scheduled resource element.

8. The wireless communication system of claim 1, wherein the plurality of carriers is included in an unlicensed frequency band.

9. The wireless communication system of claim 1, wherein the plurality of carriers is included in a 2.4 GHz frequency band.

10. The wireless communication system of claim 1, wherein a respective portion of the per-beam power budget is allocated to each scheduled resource element.

11. A method of maximizing the signal-to-interference-plus-noise ratio (SINR) of wireless signals transmitted to a particular user terminal, the method comprising:
- allocating, by a controller, a per-beam power budget among a total number of resource elements that are scheduled to be in use across a plurality of carriers included in a beam formed by a modulation transmitter, the total number of scheduled resource elements being less than a total number of available resource elements across the plurality of carriers, each available resource element corresponding to a respective, single subcarrier over a duration of a respective, single modulation symbol, and the per-beam power budget being a per-beam power limit; and
- controlling, by the controller in accordance with the allocated per-beam power budget, one or more resource elements transmitted by the modulation transmitter to communicate with the plurality of user terminals.

12. The method of claim 11, wherein allocating the per-beam power budget among the total number of scheduled resource elements comprises allocating a respective portion of the per-beam power budget to each scheduled resource element.

13. The method of claim 11,
- further comprising generating at least one resource block for transmission, via more than one scheduled resource element and in accordance with the allocated per-beam power budget, to a particular user terminal of the plurality of user terminals, the generation of the at least one resource block based on a channel characteristic corresponding to the particular user terminal; and
- wherein a first subcarrier of the more than one scheduled resource element is included in a first carrier supported by the beam, and a second subcarrier of the more than one scheduled resource element is included in a second carrier supported by the beam.

14. The method of claim 11, wherein the total number of resource elements that are scheduled to be in use across the plurality of carriers comprises a total number of resource elements that are scheduled to be in use across the plurality of carriers at a first time, and the method further comprises:
- determining an updated total number of resource elements that are scheduled to be in use, at a second time subsequent to the first time, across the plurality of carriers included in the beam;
- allocating, based on the updated total number of resource elements that are scheduled to be in use across the plurality of carriers at the second time, the per-beam power budget among the resource elements that are scheduled to be in use at the second time; and
- controlling, in accordance with the allocated respective portions of the per-beam power budget among the resource elements that are scheduled to be in use at the second time, at least one resource element of the resource elements that are scheduled to be in use at the second time and that are transmitted by the modulation transmitter to communicate data with the plurality of user terminals.

15. The method of claim 11, wherein the beam formed by the modulation transmitter is included in a plurality of non-overlapping beams formed by the modulation transmitter, and each non-overlapping beam is respectively subject to the per-beam power limit.

16. The method of claim 11, wherein the modulation transmitter is an OFDM transmitter.

17. The method of claim 11, wherein one or more respective scheduled resource elements are included in respective OFDM symbols.

18. The method of claim 11, wherein the plurality of carriers is included in an unlicensed frequency band.

19. The method of claim 11, wherein the plurality of carriers is included in a 2.4 GHz frequency band.

20. The method of claim 11, wherein allocating the per-beam power budget among the total number of scheduled resource elements comprises allocating an average power budget per scheduled resource element to each scheduled resource element.

* * * * *